E. M. BRETZ.
ATTACHMENT FOR BRIDLES.
APPLICATION FILED DEC. 22, 1910.

1,005,932.

Patented Oct. 17, 1911.

Witnesses

Inventor
E. M. Bretz
By
Attorneys

UNITED STATES PATENT OFFICE.

EVERETT M. BRETZ, OF HAMILTON, MISSOURI.

ATTACHMENT FOR BRIDLES.

1,005,932. Specification of Letters Patent. Patented Oct. 17, 1911.

Application filed December 22, 1910. Serial No. 598,708.

*To all whom it may concern:*

Be it known that I, EVERETT M. BRETZ, a citizen of the United States, residing at Hamilton, in the county of Caldwell, State of Missouri, have invented certain new and useful Improvements in Attachments for Bridles; and I do hereby declare the following to be a full, clear, and exact description of the invention, such as will enable others skilled in the art to which it appertains to make and use the same.

My invention relates to improvements in harness attachments and more particularly to a vizor adapted to be attached to the bridle of a harness to protect the eyes of the animal from hail, snow, or the like.

With this in view the invention consists primarily in a relatively stiff framework which outlines the form of a vizor, and means for attaching the vizor frame to the bridle or some other portion of the harness.

The invention further consists in a certain construction and arrangement of parts and details as is hereinafter more fully described, specifically pointed out in the appended claim, and illustrated in the accompanying drawings, which show a preferred embodiment of the invention.

Figure 1:
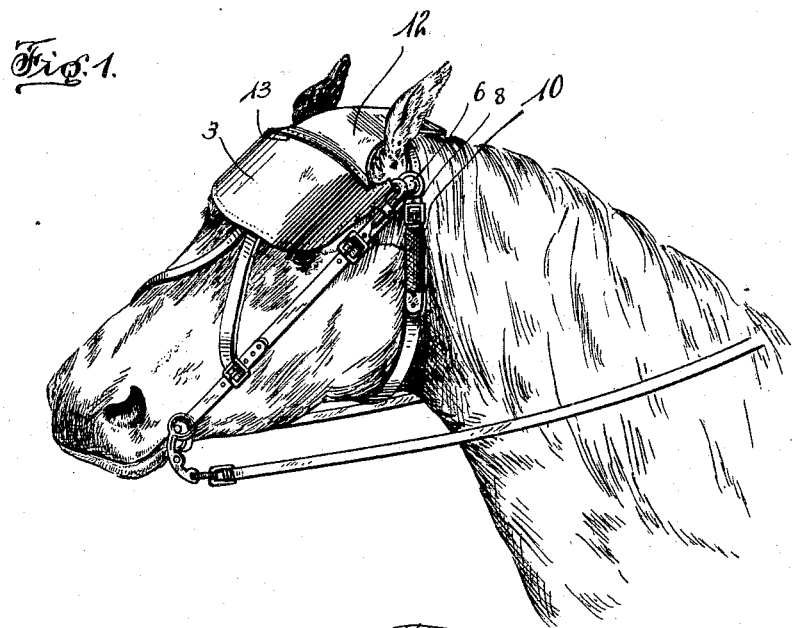
Figure 2:
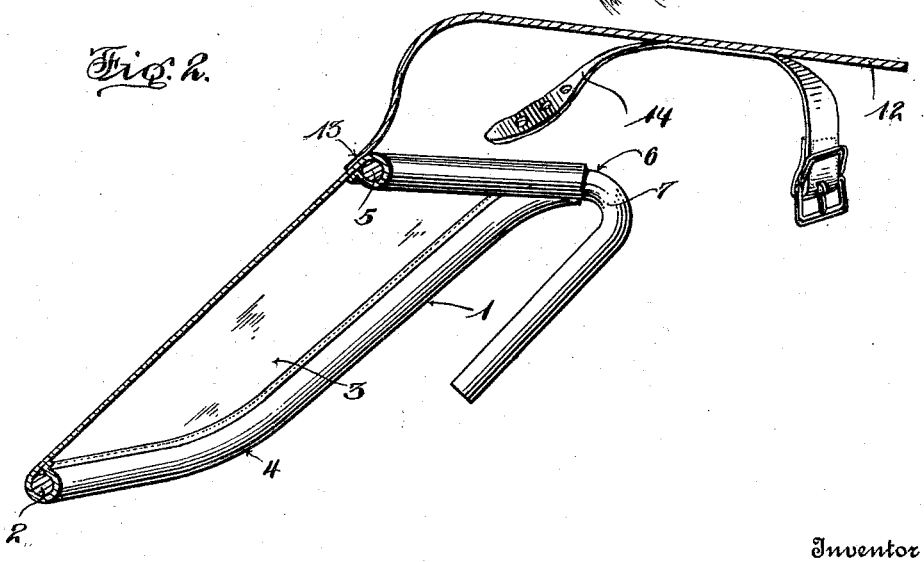

In these drawings which are attached to and form a part of this application, Figure 1 is a fragmentary perspective view of a horse showing my improved vizor in place. Fig. 2 is a longitudinal sectional view of the vizor.

Referring more specifically to these views, in which similar reference numerals designate corresponding parts throughout, 1 indicates in general the frame of the vizor which comprises a front outlining member 2 preferably formed of stiff wire and curved in approximately the shape of an ellipse to outline an overhanging portion here designated as 3. The ends of the outer frame member are bent at an angle as shown at 4.

The second frame member consists of a wire or the like 5 bent into a flattened U-shape and adapted to rest upon the forehead of a horse and curve backwardly under the ears as shown at 6. The ends of this member are also bent downwardly at an angle and may be twisted with or secured by solder or in any other manner to the downwardly turned ends of the forward outlining piece, so that the two downwardly projecting members which will as a whole be designated by 7 and 8 respectively are in effect solid rods.

In the frame work above described is secured a filler piece, preferably formed of sole-leather. This piece may be efficiently secured as shown in Fig. 2 by beading or turning it around the circular section of the frame members, the round-turned end being then sewed to the body member.

The construction so far described forms a complete vizor which may be secured to the bridle by inserting the terminals 7 and 8 beneath the loops of the cheek pieces of the bridle as shown at 10. In this position the vizor will extend outwardly and project over the eyes of the horse, and although in the normal position of the horse's head the animal will be able to see under the vizor, said vizor will act as the same structure does on caps for human wear, and will protect the eyes of the animal from sleet, hail and other conditions which might injure them or temporarily blind the animal.

An additional securing means is provided in the form of a head piece here designated 12 which comprises a sole-leather blank cut roughly in the form of a triangle and secured to the vizor proper along a line parallel to the upper frame member thereof as shown at 13. The smaller extremity of the head piece 12 goes back over the top of the animal's head between the ears, and is secured to the top of the bridle crown piece by means of a small strap or the like here shown at 14. It will thus be seen that the vizor is more securely maintained in position, and prevented from dropping forward to bear on the eyes of the animal and at the same time there is no liability of the hail or the like entering beneath the back portion of the vizor where it is supposed to contact with the forehead of the animal.

The vizor above described is not intended to be worn continuously, but is as shown formed so as to be readily detachable. It is intended that the attachment should be carried in the vehicle or on the saddle, according to the use of the horse, and should be attached and used only when conditions render such use advisable.

Although I have shown and described the device as formed of sole-leather with a steel wire frame it will be understood that this construction may be varied to conform to personal judgment or manufacturing requirements without departing from the spirit of the invention.

What I claim is:

A vizor for attachment to harness, comprising an outlining framework of relatively stiff material, said framework being provided with downwardly turned extensions adapted to engage cheek piece loops of the bridle, a filler member for said vizor framework, and a head piece secured to said vizor, extending upwardly between the ears of the animal and provided with means for attachment to the crown piece of the bridle.

In testimony whereof, I affix my signature, in presence of two witnesses.

EVERETT M. BRETZ.

Witnesses:
  J. F. ANDERSON,
  F. McADOO.